United States Patent Office 3,167,447
Patented Jan. 26, 1965

3,167,447
CARBON BODY TREATMENT
Geoffrey R. Tully, Jr., Poway, Byron F. Disselhorst, Solana Beach, and Dwight E. Davis, Escondido, Calif., assignors, by mesne assignments, to the United States of America as represented by the United States Atomic Energy Commission
No Drawing. Filed Aug. 18, 1961, Ser. No. 132,510
9 Claims. (Cl. 117—46)

The present invention generally relates to carbon body treatment and more particularly relates to a method of substantially reducing the permeability of carbon bodies to fission products, thereby improving the utility of such carbon bodies as construction materials in nuclear reactors and the like. This invention further relates to the improved low permeability carbon bodies and has special application in the production of mechanically strong, low permeability graphite bodies for nuclear fuel elements.

Heretofore, carbon bodies for use in nuclear reactors have been made by a variety of processes. For example, carbon in one of its forms, i.e., amorphous carbon, graphite or the like, can be mixed together with pitch or binders or other suitable binders and then warm pressed or extruded into the desired shape. After shaping, the formed "green" body is then baked at an elevated temperature in order to carbonize the binder and vaporize the volatile constituents therefrom. In order to obtain a suitable product, the baking process must be carried out at a very slow rate.

Such carbon bodies have a relatively low density, and a relatively high porosity, and may be relatively weak. Improved carbon body-forming processes have increased the strength of the products over that obtained in the described process. However, further increases in strength, and density and further reductions in porosity are desirable. Thus, strength is particularly important in the manufacture of carbon bodies which are to be utilized as structural components in nuclear reactors. Thermal and mechanical stresses must be withstood over the operating life of the reactor. Moreover, it is of considerable importance in some applications to reduce the porosity of the carbon body as far as practical so that fission products cannot migrate therethrough at a relatively high rate. Carbon bodies which are relatively impermeable, that is, have low permeability to the passage of fission products therethrough are particularly suitable for use in the containment of fissionable material, as in fuel elements, etc.

Considerable difficulties arise in imparting a low degree of permeability to carbon bodies during or after formation thereof without substantial cracking and fissuring of the carbon body. Thus, it would be desirable to provide an effective method whereby carbon bodies could be substantially impermeabilized to a desired degree without cracking to provide low porosity, relatively high density, high strength products.

Accordingly, it is the principal object of the present invention to provide improved carbon bodies having low permeability to the passage of fission products. It is also an object of the present invention to provide improved carbon bodies having low permeability or porosity, and high density and strength. It is a further object of the present invention to provide an effective method of making such improved carbon bodies. It is a still further object of the present invention to provide improved graphite products suitable for use in nuclear reactors and the like. It is also an object of the present invention to impermeabilize graphite in a manner which avoids the development of cracks, fissures and other flaws therein while substantially preserving or increasing the strength of the graphite. Further objects and advantages of the present invention will become apparent from the following detailed description of the invention.

Basically, the method of the present invention comprises impregnating a carbon body, such as a graphite body or the like, in a manner which allows the body to be subsequently heated to polymerize and carbonize the impregnant while providing for rapid release from the carbon body of gas formed during polymerization and carbonization. Gas build-up within the carbon body with consequent cracking thereof are thereby avoided. The method contemplates successive treatment cycles, each cycle including impregnation, curing and carbonization, until the permeability of the carbon body has been reduced to the desired degree. Thus, the method of the present invention comprises impregnating a carbon body, such as graphite, with a polymerizable substance and treating the graphite to leave a portion of the carbon body in the porous condition to provide escape means for gas generated during subsequent polymerization (curing) and carbonization steps. The polymerizable impregnant is then cured, carbonized and graphitized. The procedure is repeated until the desired impermeabilization is effected.

Now referring more particularly to the method of the present invention, a carbon body of any suitable size and shape, which carbon body may be fabricated in any conventional manner, such as that previously described, i.e., the warm pressing or extruding and baking technique, etc. is impregnated with a suitable impregnant. It will be understood that by carbon body is meant a body fabricated from amorphous carbon, graphite or the like. For certain purposes, graphite is preferred. The method of the present invention is particularly useful in the impermeabilization of hollow graphite bodies, preferably having relatively thin walls.

The impregnating is carried out using an impregnant which comprises any suitable polymerizable substance. Such substance effects the desired pore-filling function, is capable of undergoing controlled polymerization and carbonizes to a substantial carbon residue. The substance preferably is liquid, has a relatively long shelf life and pot life (life in use as impregnant), does not readily polymerize at ambient temperature, etc. For the purposes of the present invention, certain impregnants are preferred. Thus, for example, a mixture of furfuryl alcohol and maleic anhydride has been found to be particularly suitable, especially when the mixture also includes ethyl cellulose. Furfural and phenol mixtures may also be used, as may divinyl benzene. Any suitable substance having similar properties may be utilized.

It has been found that the viscosity of the impregnant should be sufficiently high to selectively enter and fill the large pores of the carbon body during processing. In this regard, the viscosity of the impregnant can be increased by adding a substance, such as ethyl cellulose, thereto. Thus, for example, a monomeric system, comprising furfuryl alcohol, maleic anhydride can have ethyl cellulose in controlled amounts for desired viscosity. The high viscosity impregnant enters to a greater degree in the large pores of the carbon body and provides a carbon residue therein after the curing and carbonizing steps. On the other hand, the small pores are left relatively empty, providing channels for outgassing in subsequent curing and carbonizing steps. Without the addition of the ethyl cellulose before impregnating the carbon body, the same monomeric system may be expected to fill not only the large but also the small pores of the carbon body with resultant spalling during the subsequent steps.

It is usually preferred to use an impregnant having a viscosity of between about 10,000 and about 20,000 cp. for the initial impregnating step. Such an impregnant may, for example, comprise 10 mols of furfuryl alcohol per mol of maleic anhydride, with 15 percent by weight of the total mix of ethyl cellulose added for its viscosity-increasing properties. As the number and/or diameter of the pores to be filled decreases in subsequent treatment cycles, it is preferred to reduce the viscosity of the impregnant for the impregnating step gradually to as low as, for example, about 500 cp. Of course, the viscosity selected can be somewhat varied, as desired, depending on the particular results to be achieved.

Before the impregnating step is carried out, the carbon body may, if desired, be machined to approximate size, smoothness, etc. It has been found to be desirable to machine the carbon body to dimensions slightly greater than those desired in the finished product, in order to compensate for possible warpage or shrinkage during subsequent processing steps. It will be understood that comparable methods of dimensioning the carbon body may be effected, if desired.

The impregnating step is, as described, carried out in a manner which provides in the carbon body a substantial proportion of impregnant-filled pores. In a preferred embodiment of the method of the present invention, the carbon body is immersed in or otherwise contacted with the impregnant.

In subsequent steps, in accordance with the present method, some of the pores in the carbon body are cleared of impregnant. Subsequently, curing and carbonization of the impregnant within the pores are effected in separate steps.

Thus, the impregnant is first introduced in a substantial amount into a substantial proportion or all of the pores at one or more surfaces of the carbon body. Thus, for example, 15 weight percent of the impregnant can be added to the carbon body. The impregnating is accomplished by any suitable means, for example, fluid (gas, etc.) pressure drive, or by a vacuum-pressure technique. The latter technique comprises subjecting the carbon body in contact with the impregnant (e.g., immersed therein) alternately to superatmospheric and subatmospheric pressure until a substantial amount of the impregnant has been forced into the pores. For example, a series of pressure-vacuum cycles comprising 30 minutes at 150 p.s.i. (with helium) and 30 minutes at a vacuum approximately 30 inches mercury (i.e., —30 inches mercury) can be employed to good effect. Such series can be carried out over, for example, a 7–16 hour period. The carbon body, if desired, can be held at increased pressure, e.g., 150 p.s.i. helium for a period of time to aid the impregnating.

Following the impregnating step, the carbon body can be removed from contact with excess impregnant, e.g., withdrawn from immersion in impregnant and wiped clean, as by toweling, dipped in a wash, such as furfuryl alcohol, to remove excess impregnant from the surface thereof, or otherwise cleaned.

The impregnated carbon body is then treated to open a substantial proportion, for example, about 5 percent, of the impregnant-filled pores.

This treatment may be carried out in any suitable manner. Preferably, however, a pressure differential is established across the pore-filled region of the carbon body. In the case of hollow carbon bodies, such as graphite tubes and the like, the pressure differential can be readily established with an increased or superatmospheric pressure exerted on one surface of the carbon body and a lower or normal pressure on the opposite surface of the body so as to, in effect, blow the impregnant out of a substantial proportion of the pores of the carbon body, clearing those pores for use as gas passageways.

The proportion of pores to be blown out will depend upon the amount of and the character of the impregnant, the geometry of the carbon body, contemplated polymerization and carbonization temperatures, etc. However, it has been found that, for example, pore-filled surfaces of graphite tubes can be subjected for a period of about one hour or so to a pressure, for example, of about 50 p.s.i. of helium, which pressure is sufficient to open up a sufficient proportion of the graphite pores by removing impregnant, for example, from about 5 to about 20 percent of that initially added. The impregnant-cleared pores prevent excess gas build-up during curing and carbonization of the impregnant within the remaining pores. Thus, the increased pressure can, if desired, be exerted on the inner volume of the tubes, with the outer surfaces of the tubes subjected to atmospheric pressure.

It will be understood that whatever particular technique of impregnating and pore-freeing is employed, multiple applications of the impregnant will usually be necessary, separated by curing and carbonizing steps, in order to eventually provide the carbon body with the desired low degree of porosity or permeability to fission products, while avoiding cracking of the carbon body due to excessive gas build-up. Multiple applications of impregnant result in the filling of larger and larger proportions of the pores within a given area. Pore filling of progressively smaller size pores, as previously indicated, can be accomplished by progressively reducing the viscosity of the impregnant and adjusting the pressure employed during pore filling, etc.

After some pores of the carbon body in the impregnated region have been cleared of impregnant, as by the blow-through technique, the carbon body is then again cleaned of excess impregnant, as by wiping, dipping, etc. and is then subjected to a curing operation to polymerize the impregnant at a controlled rate. The curing can be effected, for example, at a temperature of between about 60° C. and about 100° C., as in a curing oven or the like, with or without evacuation of gases generated by the polymerization and with or without superatmospheric pressure. Other curing temperatures may be used, and will depend upon the results desired and more particularly upon the particular polymerizable substance comprising the impregnant-filling pores of the carbon body. Such curing is continued at a controlled rate for a suitable length of time, that is, sufficiently slowly to minimize build-up of gases in the carbon body and, therefore, to minimize danger of spalling or cracking of the carbon body. It is preferred to initially cure at a low temperature, e.g., 60° C., and increased pressure, e.g., 80 p.s.i. helium, for a considerable period of time, e.g., 16 hours. Subsequently, the curing temperature can be increased to, e.g., 100° C., at atmospheric pressure, and curing can be completed in a relatively short period of time, e.g., 5 hours. A proportion of the impregnant goes off as gas during the polymerization, e.g., about 20 weight percent. When the polymerization of the impregnant has been substantially completed, the carbon body is ready for the carbonization step.

Carbonizing of the cured impregnant in the pores of the carbon body can be effected by any suitable apparatus, as for example, an electrically heated stainless steel chamber, preferably in the presence of a blanket of inert gas, e.g., 2–12 p.s.i. helium. Therein, the carbon body can be subjected to controlled and gradual heating up to an elevated temperature, i.e., up to about 1000° C. or more, to gradually convert the polymerized impregnant to carbon at a controlled rate. The carbonizing step may, for example, be carried out over a period of about 2–4 days, depending on individual requirements, etc., and gas formed during such step may be removed, if desired, from the carbonizing zone by evacuation, etc. The carbonizing step is carried out sufficiently slowly so that a build-up of gases within the carbon body to an extent which would result in spalling, cracking, etc. of the carbon bodies is avoided. Instead, gases formed during carbonization of the impregnant pass from the carbon body through the cleared pores of the carbon body. Thus, it is preferred to gradually heat the carbon body from about 100° C. to about 500° C. at a temperature rise rate of about 13° C. per hour, and to heat from about 500° C. to about 900° C. at a temperature rise rate of about 50° C. per hour. The overall time for the carbonizing step, is therefore, about 2 days. During this time, the impregnant is converted to carbon, with a net gain of carbon for the carbon body of, for example, about 5–6 percent by weight, i.e., about 45 percent of the impregnant.

The carbon body following the carbonization step, as previously indicated, may be recycled through the impregnating, curing and carbonizing steps a sufficient number of times until the desired low permeability has been reached.

Graphitizing of the carbon formed within the pores is also carried out in accordance with the present method, particularly when a graphite body is being treated. The graphitizing step can be carried out after the carbonizing step during one or more of the treatment cycles, i.e., impregnating, curing and carbonizing cycles, and is always carried out following the final carbonizing step. Preferably, it also follows carbonizing at the end of the third cycle of steps. Graphitizing can be effected at any suitable temperature utilizing any suitable equipment, for example, between about 2000° C. and about 2800° C. in an electric graphitization furnace, for example, powered by a low voltage, high current power supply or the like, resistance heated and helium purged during operation. It is preferred that the initial and final graphitizing steps be at a relatively high temperature, e.g., 2800° C. Additional graphitizing can be effected at a somewhat lower temperature. The graphitizing steps at graphitizing temperature can be carried out rather rapidly, as for example, in 30 minutes. However, the heat-up to and cool-down from graphitizing temperature are carried out slowly, so that the usual total time for the graphitizing step is about 8–12 hours.

If desired, after graphitization has been carried out or at the end of one or more other cycles, the carbon body can be machined to final size and shape.

Thus, in accordance with the method of the present invention, partial impregnation of the carbon body is carried out in cycles, each impregnating step within each cycle being followed by curing and carbonization steps, and in one or more cycles graphitization of the carbon so formed in the pores is also effected.

The treatment conditions will vary from cycle to cycle, depending upon the results to be achieved. Usually, the blow-through step, that is, the pore-reducing step, is necessary only in the first two cycles. In each of those two cycles, it follows the impregnating or pore-filling step.

As described, the pore-clearing step in the first cycle usually involves the removal of somewhat more than about 5 percent of the impregnant in the pores. However, when the pore-clearing step is carried out in the second cycle usually somewhat less than about 5 percent of the impregnant is removed thereby. In the second cycle, in order to provide an impregnant having a viscosity between about 5000 and about 15,000 cp., and preferably about 7000 cp., the ethyl cellulose content of the mixture is adjusted. Thus, for a 7000 cp. viscosity, utilizing a furfuryl alcohol and maleic anhydride mixture, the percentage of ethyl cellulose added is usually about 12 percent.

Seven standard pressure-vacuum applications, as previously described, at a pressure of 150 p.s.i. will, for example, result in the introduction of approximately 11 weight percent of the impregnant into the carbon body. It is preferred that the curing step and the carbonization step be carried out in a manner identical to that of the first cycle.

As previously indicated, the viscosity of the impregnant is gradually reduced as the number of cycles increases. Thus, in a third impregnation cycle the impregnant preferably has a viscosity between about 2000 and about 8000 cp. However, the viscosity need not be substantially lower than that of the impregnant of the second cycle.

Usually, it is necessary to slightly increase the length of time of impregnating as the permeability of the carbon body decreases due to multiple impregnations. Thus, for example, in order to introduce about 2 weight percent of the impregnant in the third cycle into the carbon body, as many as 18 or more pressure-vacuum cycles may be necessary.

The blow-through or pore-clearing step can usually be dispensed with in the third and subsequent cycles, and the impregnated carbon body can thereupon be cured immediately after impregnating. The curing step in the third cycle can be carried out under any suitable conditions. However, it has been found that it is unnecessary to employ superatmospheric pressure during curing in the third cycle and subsequent cycles.

The carbonization step is conducted in a similar manner throughout the cycles, except that the total carbonization time is usually increased gradually, from cycle to cycle. Thus, a carbonization time as long as 6 days may be employed where 6 or more cycles are carried out.

As previously indicated, graphitization is carried out after one or more carbonization steps and is preferably employed at the end of the third cycle or fourth cycle.

The fourth to sixth cycles can be carried out substantially identically with the third cycle, except that in the fourth cycle the viscosity of the impregnant is preferably between about 1000 and about 5000 cp. and that of the fifth and sixth cycles is preferably between about 500 and about 1500 cp. In the fifth and sixth cycles, or in other comparable cycles where a sufficiently low viscosity is desired, if furfuryl alcohol and maleic anhydride are employed, the mixture may comprise about 10 mols of furfuryl alcohol plus one mol of maleic anhydride without added ethyl cellulose. A sufficient amount of prepolymerization can be effected at, for example, 40° C. to adjust the viscosity to the desired level without formation of solid constituents.

The carbon is machined to the desired size and shape, and after the fifth cycle the carbon body is heat treated at 2000° C. or graphitization is carried out. In any event, following the final cycle, a final graphitization step at about 2800° C. should be effected. It will be obvious to those skilled in the art that the number of cycles, the conditions of the steps within the cycles and other features can be varied while still obtaining desired results, in accordance with the present invention.

Cycle by cycle, the permeability of the carbon body is reduced, and in the final product the permeability has been reduced to such an extent that fission products pass through the carbon body with at least considerable difficulty. Carbon or graphite permeabilities to helium at room temperature as high as about $10^{-1}$ cm.$^2$/sec. can be effectively decreased to values as low as about $10^{-5}$ cm.$^2$/sec.

The pore-filling method for impermeabilizing carbon, such as graphite, in accordance with the present invention, results in an increase in density and reduction in porosity of the carbon body and also somewhat increases the mechanical strength of the carbon body. The method can be successfully carried out on a variety of shapes and sizes of carbon bodies, including relatively large sizes of carbon bodies, without cracking, fissuring, spalling or otherwise impairing the quality of the carbon bodies.

The following example further illustrates certain features of the present invention.

EXAMPLE

A hollow cylindrical graphite tube intended for use as a nuclear fuel container in a nuclear reactor fuel element was reduced in permeability from a value of about $6 \times 10^{-1}$ cm.$^2$/sec. to helium at room temperature to a low permeability of approximately $2 \times 10^{-6}$ cm.$^2$/sec. in accordance with the method of the present invention, so as to substantially reduce the rate and extent of fission product migration from nuclear fuel to be disposed within the container. The reduction in permeability was effected by carrying out the method of the present invention. The graphite tube was approximately 48 inches long and had a wall thickness of about 0.43 inch. The internal diameter was about 2.70 inches and the external diameter was about 3.55 inches. The ultimate desired internal diameter was about 2.75 inches and the external was about 3.50 inches so that, in effect, an excess thickness of about 0.05 inch of graphite was present on both the inner and outer surfaces of the tube to compensate for any warping or shrinking which might occur during subsequent treating of the tube. The tube was thoroughly inspected visually and also by ultrasonic tests for cracks and by bubble check for areas of excess porosity. It was found sound and its permeability was determined to be as previously indicated.

The tube was outgassed for 5 hours at room temperature in an impregnation vessel. Thereupon the impregnant was drawn into the impregnation vessel in a sufficient amount to submerge the tube. The impregnant comprised a mixture having a ratio of 10 mols of furfuryl alcohol to one mol of maleic anhydride with about 15 percent, by weight of the total mixture, of ethyl cellulose added to increase the viscosity. The amount of ethyl cellulose was sufficient to increase the viscosity of the solution to about 15000 cp.

In the impregnating vessel, the tube was subjected to a series of 7 pressure-vacuum cycles or applications to effect penetration of the impregnant into the tube. Each cycle consisted of a period of 30 minutes at 150 p.s.i., furnished by helium, followed by a period of 30 minutes at subatmospheric pressure, e.g., very low vacuum of about −30 inches mercury. Following the seven pressure-vacuum cycles, the tube was left for a soak period of 18 hours under a 150 p.s.i. pressure of helium. Approximately 15.5 weight percent of the impregnant was added to the tube by this operation.

Thereafter, the impregnant was drained from the impregnation vessel and the tube withdrawn therefrom, removed from its cradle, wiped clean of excess impregnant from the inner and outer surfaces, and placed in a clean cradle. It was then passed to a blow-through mechanism comprising a zone with a pressure-imparting means, whereby the inside of the tube, that is, the inner volume of the tube, was pressured with 50 p.s.i. of helium while the outer surface of the tube was left unpressured, i.e., at atmospheric pressure. This condition was maintained for a period of about 1 hour, at the end of which time approximately 19 weight percent of the impregnant that had been added to the tube had been blown out of the pores of the tube. A sufficient number of pores of the tube were cleared to prevent cracking of the tube during subsequent curing and carbonizing steps.

The tube was then wiped clean of the impregnant which had been removed from the pores and was placed in its cradle and moved into an electrically-heated furnace operating at about 60° C. The furnace was maintained at a pressure of about 80 p.s.i. helium and the tube was maintained at that temperature and pressure for 16 hours, after which the pressure was reduced to atmospheric pressure and the temperature was increased to 100° C. and maintained for 5 hours. The impregnant during the cure period was polymerized without producing excess amounts of gas at any given time. Accordingly, cracking of the tube was avoided. The curing step was terminated when the polymerization was completed.

The tube was then removed from the cure furnace and placed in an electrically heated carbonization furnace utilizing a 12 kilowatt power source. In the carbonization furnace, the tube was continuously purged with helium at a pressure of 2–12 p.s.i. and heated at a controlled rate up to 1000° C. over a period of 2 days to convert the polymerized organic impregnant to carbon. The gas generated during the carbonization was removed and the rate of generation was sufficiently slow to prevent spalling of the graphite tube. In this connection, the graphite was heated up to about 500° C. at a temperature rise rate of about 13° C. per hour and was heated from about 500° C. to about 1000° C. at a temperature rise rate of about 50° C. per hour. After the carbonization was completed, the graphite tube exhibited a net gain of 5.6 weight percent carbon, representing 44.6 weight percent of the impregnant present in the tube after the blow-through step. The permeability of the tube was found to be about $2 \times 10^{-1}$ cm.$^2$/sec. to helium at room temperature.

The first cycle of treatment of the tube was thereupon completed and the tube was recycled to the impregnating zone and resubjected to a second cycle of impregnating, pore-clearing, curing and carbonizing.

The conditions for the second cycle varied from those described for the first cycle in that outgassing before impregnating was carried out for 1.5 hours and the impregnant had a viscosity of 7000 cp. and contained 12 percent of ethyl cellulose in the furfuryl alcohol-maleic anhydride mix. Approximately 10.7 weight percent of the impregnant was introduced by the pressure-vacuum cycle series into the tube, and the blow-through procedure, previously described, removed 6 percent of the impregnant from the pores.

The cure times, temperatures and pressures were the same for the second cycle as for the first cycle and during the curing, 5 weight percent of the impregnant was removed from the tube as off-gas. The carbonization step was also the same as was carried out in the first cycle. The total carbon gain was 3.92 percent to provide a carbon yield from the impregnant in the tube after the blow-through step of about 39.3 percent. At the end of the second cycle, the permeability was $2 \times 10^{-2}$ cm.$^2$/sec. to helium at room temperature. The tube was then passed back to the impregnating zone for a third cycle of treatment.

The third cycle of treatment differed from the first two cycles in that the number of pressure-vacuum cycles was extended to 18 and the soak period was eliminated. Also the blow-through step was eliminated. In addition, the entire curing step was carried out at atmospheric pressure. Moreover, the carbonization time was increased.

The third cycle was initiated by evacuating or outgassing the tube at room temperature for 5 hours. It was followed by the 18 pressure-vacuum cycles employed to introduce 1.9 weight percent of 6000 cp. impregnant into the tube. The impregnant had approximately the same composition as that described for cycle 2, but a lower viscosity. After the impregnating and wiping, the tube was cured, the curing effecting the removal of 15 weight percent of the impregnant as reaction off-gas. Carbonization was then carried out for three days. It resulted in 0.7 weight percent carbon gain representing 34 weight pecent of the impregnant. At the end of the carbonization, the permeability of the tube had decreased to $7 \times 10^{-3}$ cm.$^2$/sec. to helium at room temperature.

Graphitization was then effected by passing the tube through a furnace having a 2 foot temperature zone heated to 2800° C., the rate of travel of the tube through the zone being such that each portion of the tube was slowly heated and was then graphitized at the indicated high temperature for at least 30 minutes. A helium atmosphere was employed in the furnace. The permeablity of the tube folowing the graphitization was $1 \times 10^{-2}$ cm.$^2$/sec. to helium at room temperature.

The graphitized tube was then machined to final dimensions, the machining not affecting the permeability.

The tube was then returned to the impregnating zone for a fourth cycle of treatment substantially similar to the third cycle of treatment. In this regard, the machined tube was first outgassed for 3.5 hours, and then impregnating was carried out utilizing 2100 cp. impregnant containing 10 weight percent ethyl cellulose in the furfuryl alcohol-maleic anhydride mix. Eighteen pressure-vacuum cycles introduced 2.9 weight percent of the impregnant into the tube. The curing step was carried out in a manner identical to that of cycle 3, and 11 weight percent of the impregnant passed from the tube as off-gas during curing. The carbonization cycle was extended to 5 days. A net carbon gain of 1.1 weight percent and a carbon yield of 38 percent were obtained. The permeability after carbonization was about $1 \times 10^{-3}$ cm.$^2$/sec. to helium at room temperature.

The tube was then returned to the impregnating zone for a fifth cycle of treatment substantially similar to the fourth cycle. Out-gassing was first carried out for one hour at room temperature, then in the presence of impregnant, a series of 16 pressure-vacuum cycles introduced 1.3 weight percent of the impregnant into the tube. The impregnant comprised 10 mols of the furfuryl alcohol per mole of the maleic anhydride and had been pre-polymerized by holding at about 40° C. for about 24 hours, until the viscosity was 550 cp.

Curing was carried out at atmospheric pressure according to the same technique utilized in the third and fourth cycles, and released 7.8 percent of the impregnant as off-gas. Carbonization was carried out for four days to yield a carbon yield of 42 weight percent. The permeability decreased to $7 \times 10^{-6}$ cm.$^2$/sec. to helium at room temperature.

Final graphitization was then carried out at 2800° C. in the previously described manner to provide a finished product having substantially the same permeability as that obtained after the carbonization step.

The treated tube was then allowed to gradually cool to ambient temperature and, when cool, was inspected. It was found that the tube had a uniformly low permeability, that its porosity was low and its density high. Moreover, it appeared to have an improved mechanical strength, was free of spalling, cracks, etc. For certain grades of carbon, a sixth cycle similar to the fifth may be required.

The preceding example clearly illustrates a preferred technique in carrying out the method of the present invention. The indicated technique has yielded high quality, low permeability, finished graphite and other carbon tubes, plates, etc. of substantial size. In this regard, graphite tubes as long as 10 feet or more, which are free of visible spalling, cracking, etc. may be produced. Such tubes are suitable for use in the production of fuel elements for nuclear reactors. Heretofore, it has not been feasible to produce such large crack-free low permeability graphite bodies.

The folowing table sets forth conditions for carrying out a typical multi-cycle permeability-reducing treatment in accordance with the new method of the present invention.

Table

| Treatment Cycle | Impregnant Viscosity (cp.) | Type | Post Impregnation, Percent Impregnant Removed | Cure, Pressure (p.s.i.g.) | | Carbonization time, days from 100° to 900° C. | Graphitization, ° C. | Final Shaping | Heat Treatment, ° C. |
|---|---|---|---|---|---|---|---|---|---|
| | | | | 16 hours at 60° | 5 hours at 100° | | | | |
| I | 10,000–20,000 | [1] B | Blow thru 5% | 80 | atm | 2 | | | |
| II | 5,000–15,000 | B | Blow thru 5% | 80 | atm | 2 | | | |
| III | 2,000– 8,000 | B | None | atm | atm | 3 | 2,800 | | |
| IV | 1,000– 5,000 | B | None | atm | atm | 4 | | Machine to size. | |
| V | 500– 1,500 | [2] A | None | stm | atm | 4 | | | 2000 |
| VI | 500– 1,500 | A | None | atm | atm | 6 | 2,800 | | |

[1] B = 10 mol furfuryl alcohol/mol maleic anhydride and ethyl cellulose in the range of 5 to 15% of the total mix to obtain the viscosity range specified.
[2] A = 10 mol furfuryl alcohol and 1 mol maleic anhydride, pre-polymerized with heat to obtain the viscosity indicated.

The table further illustrates conditions for carrying out the improved method of the present invention so as to obtain low permeability carbon bodies, particularly graphite bodies, suitable for use in the containment of nuclear fuel and the like. The sequential partial impregnating carried out achieves the desired gradual lowering of the permeability of the carbon body while preventing spalling, cracking, etc. The method is efficient, reproducible and relatively simple.

One important advantage of the method of the present invention is the successful treatment of so-called "large port" graphite (10–40 microns maximum pore size, as measured by mercury porosimetry). These "large port" graphites are considered to be particularly suitable for nuclear reactor use because of their improved stability in the reactor environment, i.e., in a high temperature irradiation field, and also because of their higher thermal conductivity than small pore graphites. With the method of the present invention, successful permeability reduction of "large pore" graphites can be readily achieved, in contrast to conventional treatment methods. Various other advantages of the invention are set forth in the foregoing.

Various of the features of the present invention are set forth in the appended claims.

What is claimed is:

1. A method of making an improved carbon body, which method comprises the steps of selectively filling some, but not all, of the pores throughout said carbon body by impregnating to fill the pores thereof with an impregnant comprising a polymerizable substance, applying a differential gas pressure across said body to clear said impregnant from an intercommunicating proportion of the pores of said carbon body, whereby gases evolving from said impregnant during subsequent curing and carbonizing thereof can readily pass from said carbon body through said cleared pores so that cracking of said carbon body is avoided, curing said impregnant in said carbon body, carbonizing said cured impregnant, and repeating said impregnating, pore-clearing, curing and carbonizing steps, whereby the permeability of said carbon body to fission products is lowered to provide an improved crack-free carbon body.

2. A method of making an improved carbon body which method comprises the steps of selectively filling some, but not all, of the pores throughout said carbon body by impregnating the pores thereof with an impregnant comprising a polymerizable monomeric substance, applying a gas pressure differential across said carbon body to clear said impregnant from an intercommunicating minimal proportion of the pores so that gases produced by decomposition of said impregnant during subsequent curing and carbonizing can readily pass from said carbon body without substantial pressure stress build-up therein and cracking of said carbon body, curing said impregnant in said pores to a polymerized state, carbonizing said polymerized impregnant in said pores and repeating said impregnating, pore-clearing, curing and carbonizing steps a sufficient number of times whereby an improved crack-free carbon body having low permeability to fission products is provided.

3. A method of making an improved graphite body which method comprises the steps of impregnating a carbon body by filling pores thereof with an impregnant comprising a polymerizable monomeric substance, thereafter blowing out a minor proportion of impregnant from inter-communicating pores by establishing a gas pressure differential across said body, whereby a pathway from said carbon body for gases produced by decomposition of said impregnant during subsequent curing and carbonizing steps is provided, curing said impregnant remaining in the pores of said graphite body to a polymerized state at superatmospheric pressure, a temperature of at least about 60° C. and at a slow enough rate to avoid gas build-up in said carbon body, carbonizing the polymerized impregnant in pores of said graphite body at an elevated temperature and at a controlled rate, whereby cracking of said graphite body is avoided, repeating said impregnating, pore-clearing, curing and carbonizing steps a sufficient number of times, whereby the permeability of said graphite body is substantially reduced, and graphitizing the carbon in the pores of said graphite body following at least the last carbonizing step, whereby an improved crack-free graphite body is provided having lowered permeability to fission products.

4. A method of making an improved carbon body which method comprises the steps of contacting a carbon body with a polymerizable monomeric impregnant, to fill the pores of said carbon body with said impregnant, thereafter establishing a pressure differential across said carbon body, whereby a minor proportion of impregnant is blown free from inter-communicating pores of said body so that gases produced by decomposition of said impregnant during subsequent curing and carbonizing steps can readily pass from said carbon body without substantial pressure build-up therein and cracking thereof, curing said impregnant in said carbon body to a fully polymerized state at superatmospheric pressure and a temperature between about 60° C. and 100° C., carbonizing the polymerized impregnant in said carbon body by progressively increasing the temperature thereof to about 1000° C. over a sufficiently long period of time to inhibit cracking of said carbon body, repeating said impregnating, pore-clearing, curing and carbonizing steps a sufficient number of times to substantially reduce the permeability of said carbon body to fission products to provide an improved crack-free carbon body.

5. A method of making an improved graphite body which method comprises the steps of machining a graphite body to approximate final dimensions, degassing said graphite body, contacting said graphite body in a pressure zone with an impregnant comprising a mixture of maleic anhydride and furfuryl alcohol having a viscosity of at least about 5000 cp., subjecting said graphite body while in contact with said impregnant to a series of changes in pressure between superatmospheric and subatmospheric, whereby said impregnant is driven into pores of said graphite body, removing said graphite body from contact with said impregnant and subjecting said graphite body to a transverse differential gas pressure to partially clear inter-communicating pores of impregnant, whereby gases produced by decomposition of said impregnant during subsequent curing and carbonizing steps can pass from said graphite body without substantial pressure build-up therein and cracking thereof, curing said impregnant in said graphite body to a fully polymerized state at a temperature of between about 60° C. and about 100° C. at a controlled rate in inert gas at superatmospheric pressure to avoid cracking of said body, carbonizing the polymerized impregnant in said graphite body by progressively increasing the temperature thereof up to about 1000° C. in inert gas, whereby cracking of said body is inhibited, repeating said impregnating, pore-clearing, curing and carbonizing steps, until the permeability of said graphite body is substantially reduced, said impregnating steps being effected with a series of impregnant solutions having successively reduced viscosities, and heat treating said body at a temperature of between about 2000° C. and about 2800° C. following at least the last carbonizing step to provide an improved crack-free graphite body.

6. A method of making an improved graphite body which method comprises the steps of machining a graphite body to approximate final dimensions, degassing said graphite body and impregnating said body with an impregnant comprising a mixture of furfuryl alcohol and maleic anhydride, and also containing a viscosity-determining concentration of ethyl cellulose, said impregnating being effected by contacting said graphite body with said impregnant in a pressure zone, subjecting said graphite body while in contact with said impregnant to a series of pressures fluctuating between superatmospheric and subatmospheric, whereby said impregnant is driven into inter-communicating pores of said graphite body, applying a differential gas pressure across said body to remove a minor proportion of impregnant distributed in inter-communicating pores in said body, curing said impregnant in said graphite body by completely polymerizing the same at a temperature between about 60° C. and about 100° C. at a controlled rate and in an inert gas at superatmospheric pressure for at least a portion of said curing, whereby cracking of said graphite body is avoided, carbonizing said polymerized impregnant at a temperature of up to about 1000° C. in an inert gas at a controlled rate to prevent cracking of said graphite body, repeating said cycles of impregnating, curing and carbonizing steps a sufficient number of times to reduce the permeability of said graphite body to a value of about $1 \times 10^{-6}$ cm.$^2$/sec. to helium at room temperature, said impregnating steps being carried out with impregnants having sequentially lower viscosities, to a low of about 500 cp., said curing being effected in the third and subsequent cycles at atmospheric pressure, and heat treating said carbon body at about 2800° C. after at least the last of said carbonizing steps.

7. A method of making an improved carbon body which method comprises the steps of impregnating said carbon body with an impregnant comprising a polymerizable substance containing a viscosity determining substance, curing said impregnant in said carbon body, carbonizing said cured impregnant and repeating said steps of impregnating, curing and carbonizing a sufficient number of times to reduce the permeability of said carbon body, said impregnating steps being carried out with impregnants having sequentially lower viscosities to a low of about 500 cp.

8. The method according to claim 7 in which said viscosity determining substance is ethyl cellulose.

9. The method according to claim 7 in which said impregnant comprises a polymerizable substance selected from the group consisting of furfural alcohol, maleic acid and mixtures thereof, and said viscosity determining substance is ethyl cellulose.

(References on following page)

References Cited by the Examiner

UNITED STATES PATENTS

2,368,306  1/45  Kiefer et al. _____ 117

FOREIGN PATENTS

1,104,881  4/61  Germany.
757,883  9/56  Great Britain.

OTHER REFERENCES

Watt et al.: Production of Impermeable Graphite, Nuclear Power, February 1959, pp. 86–88.

Boyland: The Reduction of the Permeability of Graphite, G.E.C. Atomic Energy Review, vol. 2, No. 1, pp. 44–50, March 1959.

Goldstein et al.: Stable Furfuryl Alcohol Impregnating Solutions, Industrial and Engineering Chemistry, vol. 52, No. 1, January 1960, pp. 57 and 58.

CARL D. QUARFORTH, *Primary Examiner.*

REUBEN EPSTEIN, ROGER L. CAMPBELL, OSCAR R. VERTIZ, *Examiners.*